US009953655B2

United States Patent
Sikri et al.

(10) Patent No.: US 9,953,655 B2
(45) Date of Patent: Apr. 24, 2018

(54) OPTIMIZING FREQUENT IN-BAND SIGNALING IN DUAL SIM DUAL ACTIVE DEVICES BY COMPARING SIGNAL LEVEL (RXLEV) AND QUALITY (RXQUAL) AGAINST PREDETERMINED THRESHOLDS

(71) Applicant: QUALCOMM Incorporated, San Diego, CA (US)

(72) Inventors: Divaydeep Sikri, Surrey (GB); Neha Goel, Surrey (GB); Jafar Mohseni, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 14/535,225

(22) Filed: Nov. 6, 2014

(65) Prior Publication Data
US 2016/0093306 A1 Mar. 31, 2016

Related U.S. Application Data

(60) Provisional application No. 62/057,166, filed on Sep. 29, 2014.

(51) Int. Cl.
*H04L 12/26* (2006.01)
*H04J 3/16* (2006.01)
(Continued)

(52) U.S. Cl.
CPC ........ *G10L 19/002* (2013.01); *G10L 19/0019* (2013.01); *H04W 88/181* (2013.01);
(Continued)

(58) Field of Classification Search
CPC ............ H04L 29/06027; H04L 1/0014; H04B 7/2656; G10L 19/22
(Continued)

(56) References Cited

U.S. PATENT DOCUMENTS 7,333,805 B2   2/2008 Oestreich
7,574,351 B2 * 8/2009 Anandakumar .. H04L 29/06027
                                                     370/473
(Continued)

FOREIGN PATENT DOCUMENTS

WO    2004105417 A1   12/2004
WO    2005034381 A1    4/2005

OTHER PUBLICATIONS

3GPP TS 05.09, "3rd Generation Partnership Project; Technical Specification Group GSM/EDGE Radio Access Network; Link Adaptation (Release 1999)", 3GPP Standard; 3GPP TS 05.09, 3rd Generation Partnership Project (3GPP), Mobile Competence Centre; 650, Route Des Lucioles ; F-06921 Sophia-Antipolis Cedex; France, No. V8.5.0, Nov. 1, 2001 (Nov. 1, 2001 ), XP050358978, pp. 1-23.
International Search Report and Written Opinion—PCT/US2015/407677—ISA/EPO—dated Nov. 26, 2015.

*Primary Examiner* — Farzad Kazeminezhad
(74) *Attorney, Agent, or Firm* — Procopio, Cory, Hargreaves & Savitch LLP

(57) ABSTRACT

A method includes: receiving a first speech frame; identifying a first codec mode based at least in part on a Codec Mode Command (CMC) comprising the first speech frame; identifying a second codec mode based at least in part on a downlink (DL) Codec Mode Indication (DCMI) comprising the first speech frame; determining, based at least in part on a current uplink (UL) codec mode, to apply one of the first codec mode, the second codec mode, and a third codec mode having a higher bit rate than the first codec mode; and applying one of the first codec mode, the second codec mode, and the third codec mode. Apply the first codec mode when the RxLev and RXQual are determined not to exceed a predetermined threshold, and applying second or third codec modes otherwise.

12 Claims, 7 Drawing Sheets

(51) Int. Cl.
*G10L 19/12* (2013.01)
*G10L 19/002* (2013.01)
*G10L 19/00* (2013.01)
*H04W 88/18* (2009.01)
*H04L 29/06* (2006.01)
*H04B 7/26* (2006.01)
*H04W 88/06* (2009.01)

(52) U.S. Cl.
CPC .... *G10L 2019/0002* (2013.01); *H04B 7/2656* (2013.01); *H04L 29/06027* (2013.01); *H04W 88/06* (2013.01)

(58) Field of Classification Search
USPC .......................................................... 704/221
See application file for complete search history.

(56) References Cited

U.S. PATENT DOCUMENTS

| | | | |
|---|---|---|---|
| 8,284,683 | B2 | 10/2012 | Kalliokulju et al. |
| 2003/0063569 | A1* | 4/2003 | Kalliokulju ....... H04L 29/06027 370/252 |
| 2004/0062274 | A1* | 4/2004 | Hakansson .......... H04B 7/2656 370/468 |
| 2005/0267743 | A1* | 12/2005 | Gerlach ................ H04L 1/0014 704/221 |
| 2008/0212575 | A1 | 9/2008 | Westberg |
| 2011/0039506 | A1* | 2/2011 | Lindahl .................. G10L 19/20 455/130 |
| 2014/0038569 | A1 | 2/2014 | Chin et al. |
| 2014/0273974 | A1 | 9/2014 | Varghese et al. |

* cited by examiner

OPTIMIZING FREQUENT IN-BAND SIGNALING IN DUAL SIM DUAL ACTIVE DEVICES BY COMPARING SIGNAL LEVEL (RXLEV) AND QUALITY (RXQUAL) AGAINST PREDETERMINED THRESHOLDS

CROSS-REFERENCE TO RELATED APPLICATION

This application claims the benefit of U.S. Provisional Patent Application No. 62/057,166 entitled "Optimizing Frequent In-Band Signaling in Dual SIM Dual Active Devices" filed Sep. 29, 2014, the disclosure of which is incorporated herein in its entirety by reference.

BACKGROUND

Under the Adaptive Multi Rate (AMR) speech codec standard, the codec mode applied to the voice data exchanged between a mobile communication device and a communication network is dynamically selected by the communication network based on changing radio channel conditions and capacity requirements. The codec modes that may be applied during an active voice call are chosen from an Active Codec Set (ACS), which include codec modes defined by the communication network as part of the initial voice call setup. When the communication network determines based on one or more channel quality indicators that radio channel conditions are poor, the communication network may select a lower bit rate codec mode from the ACS in order to accommodate an increase in redundant data added as a result of channel coding. But if the radio channel conditions improve, the communication network may select a higher bit rate codec mode from the ACS, which enhances the perceived voice quality.

In general, a conventional mobile communication device will apply the codec mode commanded by the communication network. As such, a codec mode command (CMC) from the communication network may trigger an immediate change (e.g., upgrade or downgrade) in the current uplink (UL) codec mode applied by the mobile communication device. In this respect, codec mode adaptation may in fact compromise the performance of the conventional mobile communication device, particularly in the case of a dual-subscriber identity module (SIM), dual active (DSDA) mobile communication device.

In a DSDA mobile communication device, a timeslot collision may occur when both subscriptions simultaneously attempt to perform an activity. To resolve a timeslot collision when both subscriptions attempt to perform an activity (e.g., an UL activity), the transmission of voice data (e.g., speech frames) on one subscription may be inhibited if the voice data transmission has a lower priority transmission than the transmission (e.g., signaling) on the other subscription. Also, the transmission of voice data on one subscription may be inhibited (i.e., blanked) in favor of higher priority receptions on the other subscription. As a result of frequently blanking the transmission of voice data, UL voice data from the DSDA mobile communication device tends to exhibit numerous interruptions. The communication network typically misconstrues these interruptions in the UL voice data from the DSDA mobile communication device to imply fluctuating radio channel conditions. As a result, CMCs from the communication network require the DSDA mobile communication device to change its codec mode at an excessive rate and to unnecessarily downgrade to codec modes with low bit rates, which consequently lowers the Mean Opinion Score (MOS) of the voice call.

SUMMARY

Apparatuses and methods for optimizing frequent in-band signaling are provided.

According to the various embodiments, there is provided a method. The method may include: receiving a first speech frame; identifying a first codec mode based at least in part on a CMC comprising the first speech frame; identifying a second codec mode based at least in part on a downlink (DL) Codec Mode Indication (DCMI) comprising the first speech frame; determining, based at least in part on a current UL codec mode, to apply one of the first codec mode, the second codec mode, and a third codec mode having a higher bit rate than the first codec mode; and applying one of the first codec mode, the second codec mode, and the third codec mode.

According to the various embodiments, there is provided a mobile communication device. In some embodiments, the mobile communication device may include: a control unit, a first radio frequency (RF) chain, and a second RF chain. One of the first RF chain and the second RF chain may be configured to receive a first speech frame. The control unit may be configured to: identify a first codec mode based at least in part on a CMC comprising the first speech frame; identify a second codec mode based at least in part on a DCMI comprising the first speech frame; determine, based at least in part on a current UL codec mode, to apply one of the first codec mode, the second codec mode, and a third codec mode having a higher bit rate than the first codec mode; and apply one of the first codec mode, the second codec mode, and the third codec mode.

According to various embodiments, there is provided a mobile communication device. In some embodiments, the mobile communication device may include: means for receiving a first speech frame; means for identifying a first codec mode based at least in part on a CMC comprising the first speech frame; means for identifying a second codec mode based at least in part on a DCMI comprising the first speech frame; means for determining, based at least in part on a current UL codec mode, to apply one of the first codec mode, the second codec mode, and a third codec mode having a higher bit rate than the first codec mode; and means for applying one of the first codec mode, the second codec mode, and the third codec mode.

According to various embodiments, there is provided a non-transitory computer readable medium. In some embodiments, the non-transitory computer readable medium may have stored thereon instructions for causing one or more processors to perform operations comprising: receiving a first speech frame; identifying a first codec mode based at least in part on a CMC comprising the first speech frame; identifying a second codec mode based at least in part on a DCMI comprising the first speech frame; determining, based at least in part on a current UL codec mode, to apply one of the first codec mode, the second codec mode, and a third codec mode having a higher bit rate than the first codec mode; and applying one of the first codec mode, the second codec mode, and the third codec mode.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While a number of embodiments are described herein, these embodiments are presented by way of example only, and are not intended to limit the scope of protection. The apparatuses and methods described herein may be embodied in a variety of other forms. Furthermore, various omissions, substitutions, and changes in the form of the example apparatuses and methods described herein may be made without departing from the scope of protection.

Figure 1:
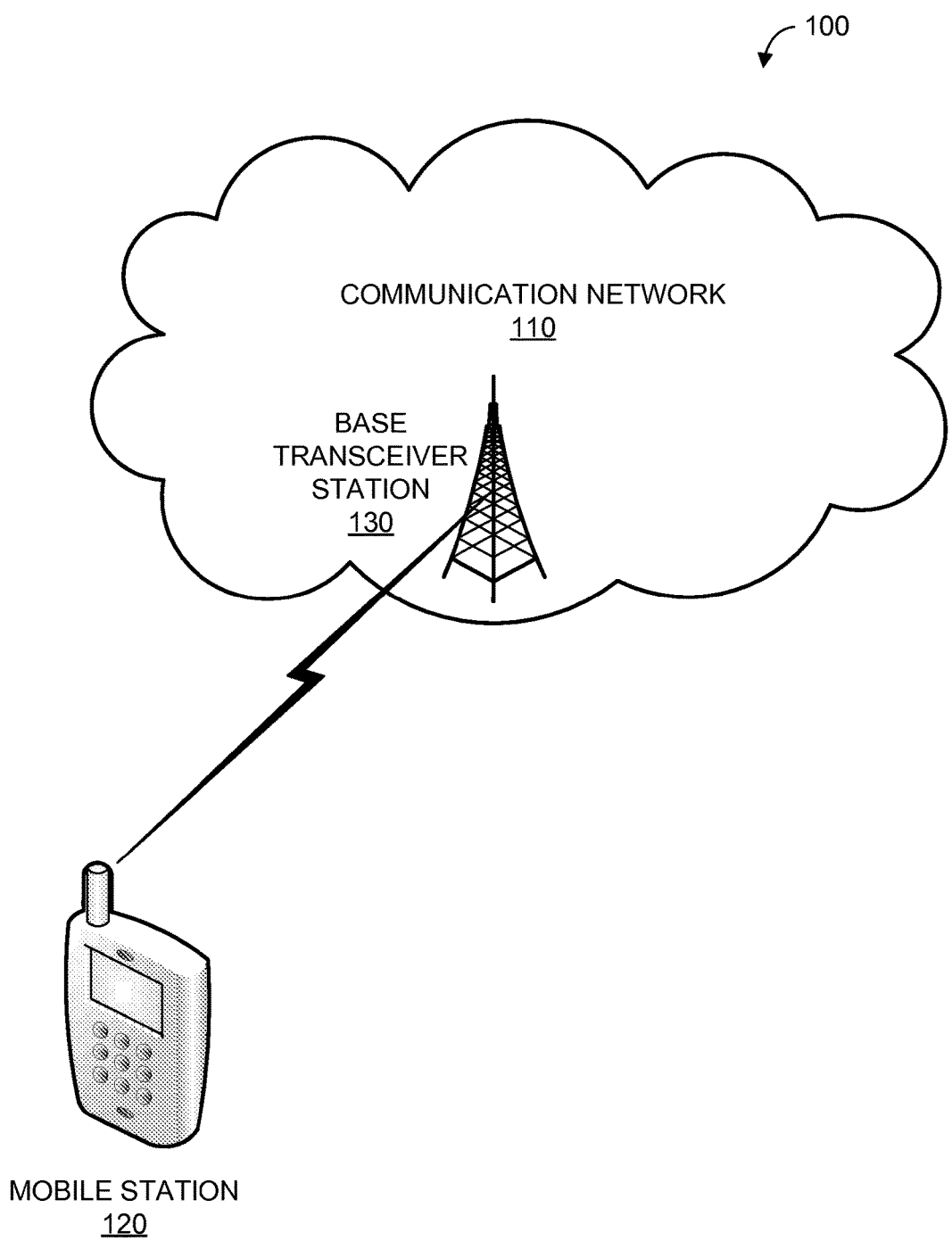
FIG. 1 is a system diagram illustrating a network environment for various embodiments.

FIG. 1 is a system diagram illustrating a network environment 100 for various embodiments. Referring to FIG. 1, a communication network 110 may include a base transceiver station (BTS) 130. In various embodiments, the communication network 110 may be, for example, but not limited to, a wireless or mobile communication network.

A mobile station (MS) 120 may communicate with the communication network 110 via the BTS 130. A person of ordinary skill in the art can appreciate that the network environment 100 may include any number of communication networks, MSs, and BTSs without departing from the scope of the present inventive concept.

When engaged in a voice call, the MS 120 may transmit voice data to the communication network 110 as well as receive voice data from the communication network 110. As part of the voice call setup, the communication network 110 may generate an ACS that includes, for example, codec modes AMR_7.95, AMR_6.70, AMR_5.90, and AMR_4.75. The codec modes that may be applied by the mobile communication device 120 are specified by the ACS.

In various embodiments, the MS 120 may transmit UL Codec Mode Indicators (UCMIs) to the communication network 110 that specify the current UL codec mode applied at the MS 120. The UCMIs are transmitted with the UL voice data from the MS 120. For example, the MS 120 may apply the AMR_6.70 codec mode from the ACS to encode the UL voice data transmitted from the MS 120 to the communication network 110. The MS 120 may transmit the encoded voice data along with UCMIs indicating the AMR_6.70 codec mode.

In various embodiments, the MS 120 may also transmit Codec Mode Request (CMR) as part of the UL voice data from the MS 120 to the communication network 110. The CMRs from the MS 120 indicate to the communication network 110 the codec mode that the communication network 110 should preferably apply to the DL voice data to the MS 120. For example, when the MS 120 detects degradation in its DL quality, the MS 120 may transmit a CMR requesting the communication network 110 to downgrade the current codec mode (e.g., AMR_6.70) that is applied to the DL voice data to a codec mode having a lower bit rate, for example, AMR_5.90.

In various embodiments, the MS 120 may receive from the communication network 110 CMCs, which are transmitted with the DL voice data to the MS 120. The CMCs inform the MS 120 of the codec mode required by the communication network 110 and may cause the MS 120 to change its current UL codec mode. For example, the communication network 110 may detect degradation in the UL quality from the MS 120. Consequently, the communication network 110 may transmit a CMC to the MS 120 that requires the MS 120 to apply a new codec mode (e.g., AMR_4.75) that downgrades the current UL codec mode applied at the MS 120. Alternately, the communication network 110 may detect improvement in the UL quality from the MS 120 and transmit a CMC to the MS 120 that requires application of an upgraded codec mode having a higher bit rate than the current codec mode (e.g., AMR_7.95) at MS 120.

Figure 2:
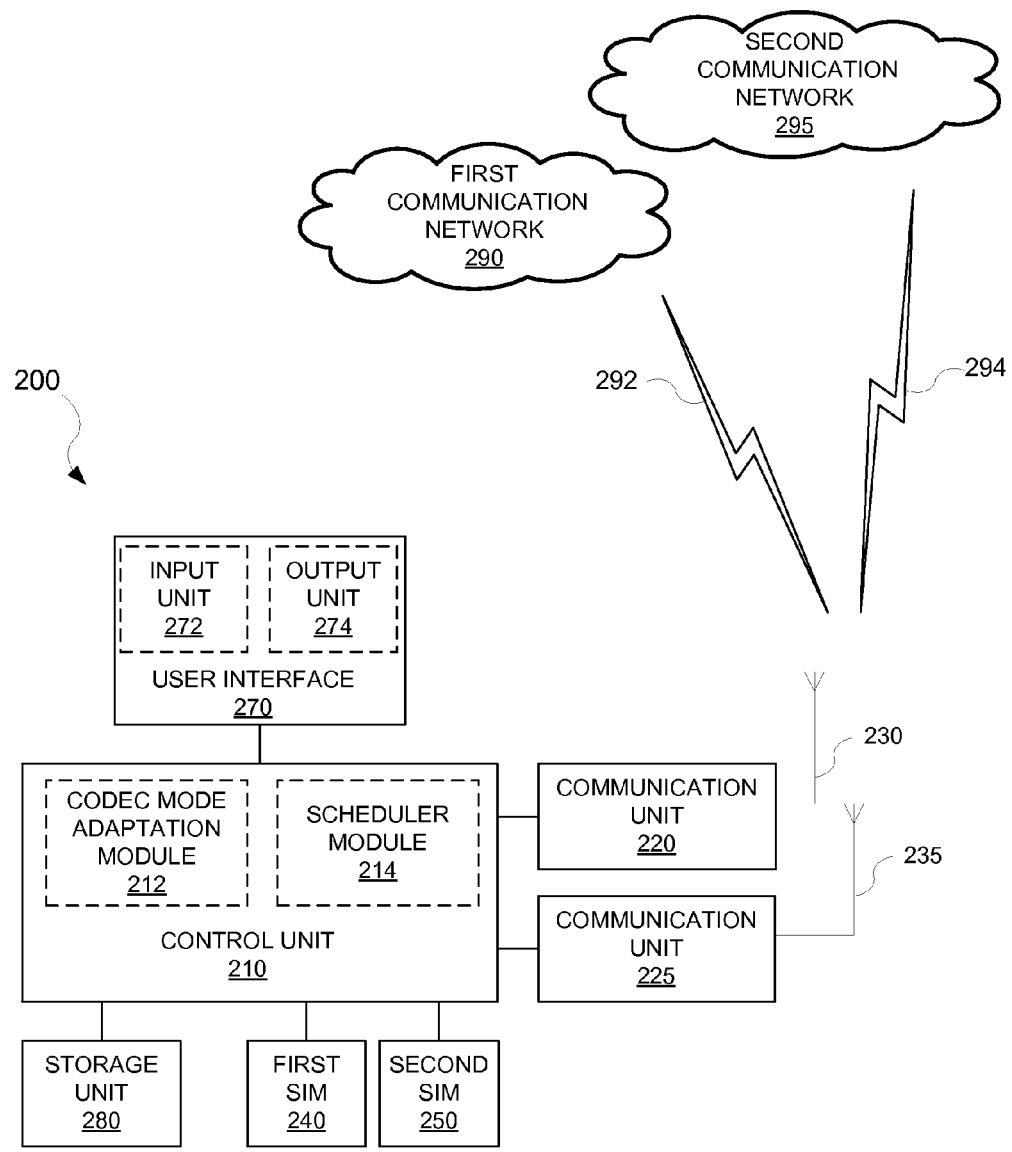
FIG. 2 is a block diagram illustrating a mobile communication device according to various embodiments.

FIG. 2 is a block diagram illustrating a mobile communication device 200 according to various embodiments. In various embodiments, the mobile communication device 200 may implement the MS 120 described with respect to FIG. 1.

Referring to FIGS. 1 and 2, in various embodiments, the mobile communication device 200 may include a control unit 210, a first communication unit 220, a second communication unit 225, a first antenna 230, a second antenna 235, a first subscriber identity module (SIM) 240, a second SIM 250, a user interface 270, and storage unit 280.

In various embodiments, the mobile communication device 200 may be any device capable of wirelessly communicating with one or more communication networks. For example, in various embodiments, the mobile communication device 200 may be, for example, but not limited to, a smartphone, a tablet PC, or a laptop computer. Although the mobile communication device 200 is shown to include the first communication unit 220, the second communication unit 225, the first antenna 230, and the second antenna 235, a person of ordinary skill in the art can appreciate that the mobile communication device 200 may include more or less than two communication units and antennae without departing from the scope of the present inventive concept.

In various embodiments, the first SIM 240 may associate the first communication unit 220 with a first subscription 292 on a first communication network 290, and the second SIM 250 may associate the second communication unit 225 with a second subscription 294 on a second communication network 295. For clarity and convenience, throughout this disclosure, the first subscription 292 is associated with the first communication unit 220 while the second subscription 294 is associated with the second communication unit 225. However, it is to be understood that either subscription may be associated with either communication unit without departing from the scope of the present inventive concept.

In various embodiments, the first communication network 290 and the second communication network 295 may be operated by the same or different service providers. Additionally, in various embodiments, the first communication network 290 and the second communication network 295 may each support the same or different communication technologies, including but not limited to Wideband Code Division Multiple Access (WCDMA), Global System for Mobile communications (GSM), Long Term Evolution (LTE), and Time Division-Synchronous Code Division Multiple Access (TD-SCDMA).

In various embodiments, the user interface 270 may include an input unit 272. In some embodiments, the input unit 272 may be, for example, but not limited to, a keyboard or a touch panel. In various embodiments, the user interface 270 may include an output unit 274. In some embodiments, the output unit 274 may be, for example, but not limited to, a liquid crystal display (LCD) or a light emitting diode (LED) display. A person of ordinary skill in the art will appreciate that other types or forms of input and output units may be used without departing from the scope of the present inventive concept.

In various embodiments, the control unit 210 may be configured to control the overall operation of the mobile communication device 200 including controlling the functions of the first communication unit 220, the second communication unit 225, the user interface 270, and the storage unit 280. In various embodiments, the control unit 210 may include a codec mode adaptation module 212 and a scheduler module 214. In various embodiments, the control unit 210 may be, for example, but not limited to, a microprocessor or a microcontroller.

In various embodiments, the storage unit 280 may be configured to store application programs, application data, and user data. In various embodiments, at least some of the application programs stored at the storage unit 280 may be executed by the control unit 210 for the operation of the mobile communication device 200.

In various embodiments, the control unit 210 may be configured to detect conflicts between activities performed on the first subscription 292 and the second subscription 294. For example, the first subscription 292 may be engaged in a voice call, which requires transmission of voice data over the Traffic Channel (TCH). At the same time, the second subscription 294 may be engaged in a data call, which involves the transmissions over the Packet Data Traffic Channel (PDTCH). When both subscriptions timeshare a single transmitter, the transmission on the first subscription 292 and the transmission on the second subscription 294 may result in a timeslot collision.

The control unit 210 may be configured to resolve conflicts by determining which activity should take precedence over the other. For example, the conflict may be resolved based on the priority associated the channel that supports each of activities. Thus, the control unit 210 may allow a higher priority PDTCH transmission to take precedence over a lower priority TCH transmission.

In various embodiments, the control unit 210 may be configured to implement codec mode adaptation for up to two simultaneous voice calls. For example, the mobile communication device 200 may use the first subscription 292 to engage in a voice call over the first communication network 290. Alternately or additionally, the mobile communication device 200 may use the second subscription 294 to engage in a voice call over the second communication network 295.

When the mobile communication device 200 is exchanging voice data with the first communication network 290, the mobile communication device 200 may receive speech frames from the first communication network 290.

Figure 3A:
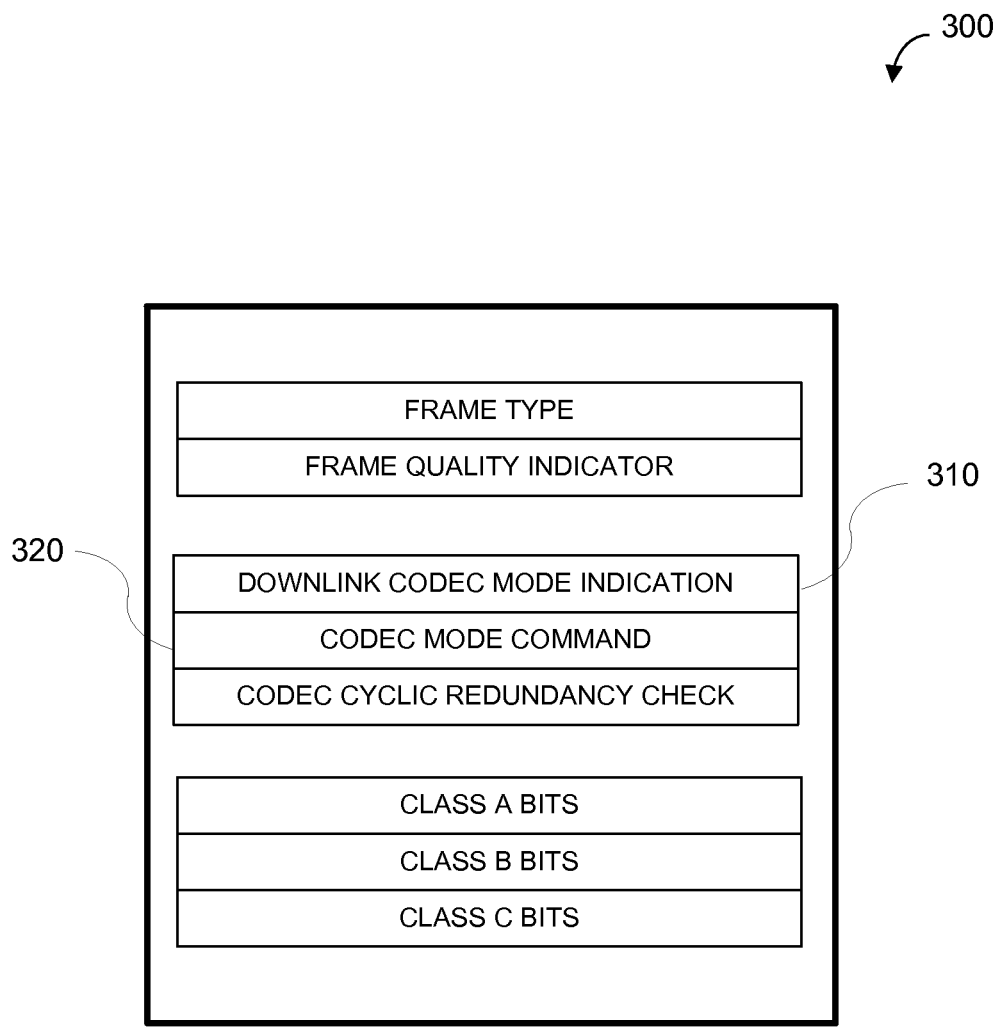
FIG. 3A illustrates the format of a DL speech frame applicable to various embodiments.

FIG. 3A illustrates the format of a DL speech frame 300 applicable to various embodiments. Referring to FIGS. 1-3A, the DL speech frame 300 includes a DCMI field 310 and a CMC field 320.

The DL voice data that the mobile communication device 200 receives from the first communication network 290 during the exchange of voice data may include CMCs and DCMIs. The CMCs in the DL voice data from the first communication network 290 indicate which one of the codec modes from the ACS should be applied to UL voice data transmitted from the mobile communication device 200. The DCMIs in the DL voice data indicate the current DL codec mode (i.e., which one of the codec modes in the ACS) that is applied to the DL voice data received at the mobile communication device 200.

When the mobile communication device 200 is exchanging voice data with the first communication network 290, the mobile communication device 200 may also transmit speech frames to the first communication network 290.

Figure 3B:
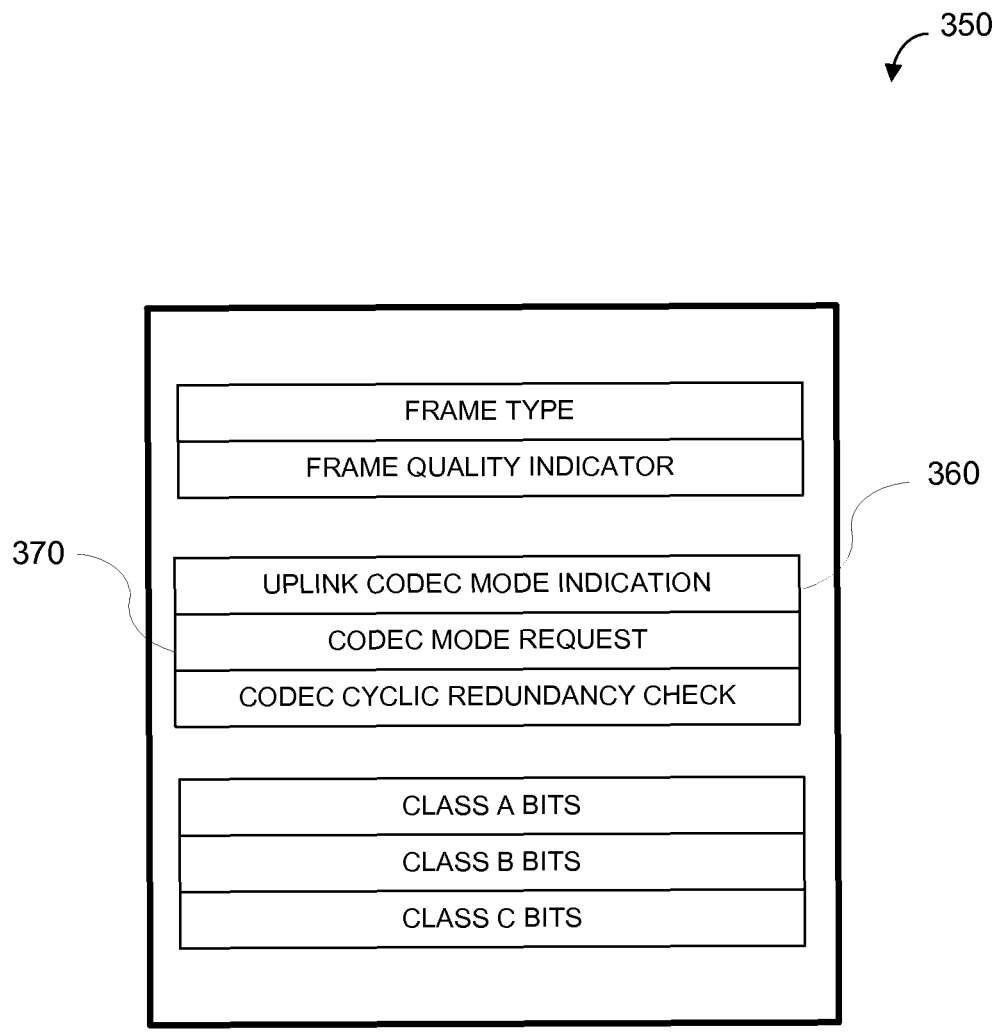
FIG. 3B illustrates the format of an UL speech frame applicable to various embodiments.

FIG. 3B illustrates the format of a UL speech frame 350 applicable to various embodiments. Referring to FIGS. 1-3B, the UL speech frame 350 includes a UCMI field 360 and a CMR field 370.

The UL voice data that the mobile communication device 200 transmits to the first communication network 290 during the exchange of voice data may include CMRs and UCMIs. In various embodiments, the control unit 210 may be configured to generate UCMIs indicating the current UL codec mode and to cause the mobile communication device 200 to transmit to the first communication network 290 the UCMIs indicating the current UL codec mode that is applied to the UL voice data transmitted from the mobile communication device 200. Also, the control unit 210 may be configured to generate CMRs requesting a different codec mode from the ACS to be applied and to cause the mobile communication device 200 to transmit to the first communication network 290 the CMRs requesting a different codec mode from the ACS to be applied to the DL voice data received at the mobile communication device 200.

Similarly, when the mobile communication device 200 is exchanging voice data with the second communication network 295, the control unit 210 may receive CMCs and DCMIs in the DL voice data from the second communication network 295, and may be configured to cause the mobile communication device 200 to transmit CMRs and UCMIs in the UL voice data to the second communication network 295. It is to be understood that control unit 210 may perform codec mode adaptation separately but in parallel and in substantially the same manner for the first subscription 292 and the second subscription 294. A person of ordinary skill in the art can appreciate that when the first subscription 292 and the second subscription 294 are both engaged in voice calls, the codec modes relevant to the voice data exchange on one subscription are independent of the codec modes relevant to the voice data exchange on the other subscription.

In various embodiments, in response to receiving a CMC from the first communication network 290 or from the second communication network 295, the control unit 210 may be configured to selectively downgrade the current UL codec mode to the codec mode assigned by the CMC. For example, the control unit 210 may determine to disregard the lower bit rate codec mode assigned in the CMC based on the quality of radio channel conditions.

Figure 4:
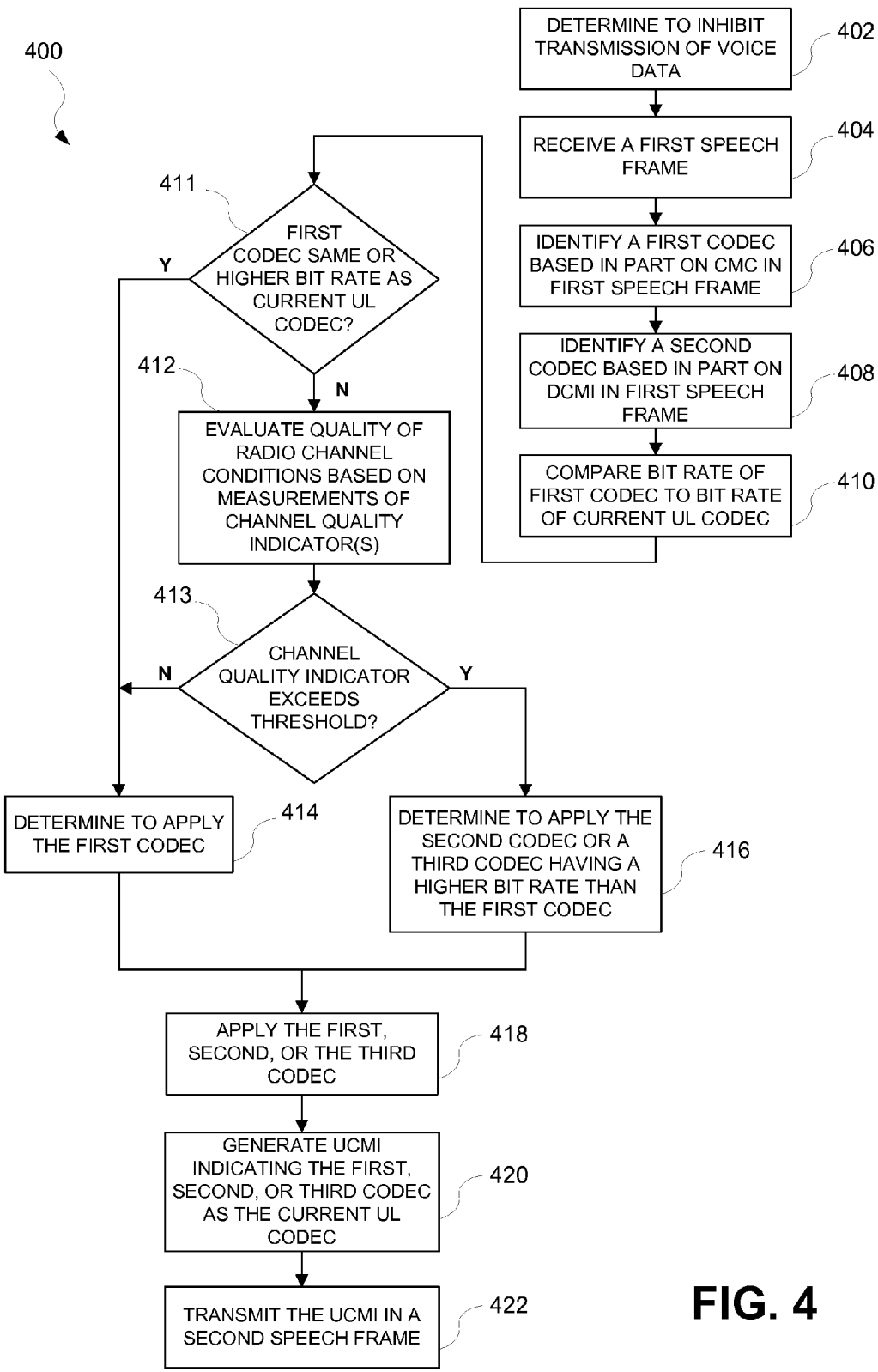
FIG. 4 is a flowchart illustrating a process for optimizing frequent in-band signaling according to various embodiments.

FIG. 4 is a flowchart illustrating a process 400 for optimizing frequent in-band signaling according to various embodiments. With reference to FIGS. 1-4, in various embodiments, the process 400 may be performed by the control unit 210, for example, by the codec mode adaptation module 212.

The control unit 210 may determine to inhibit the transmission of voice data (402). For example, the mobile communication device 200 may be engaged in a phone call using the first subscription 292 and exchanging voice data with the first communication network 290. The control unit 210 may determine to inhibit the transmission of voice data on the first subscription 292 in order to allow the second subscription 294 to perform one or more activities. In some instances, this may cause the first communication network 290 to transmit CMCs that require the mobile communication device 200 to downgrade the current UL codec mode applied to the UL voice data transmitted from the mobile communication device 200 to the first communication network 290 on the first subscription 292.

The control unit 210 may receive a first speech frame (404). The first speech frame may include a CMC field indicating a first codec mode from the ACS that should be applied to the UL voice data transmitted from the mobile communication device 200 to the first communication network 290 on the first subscription 292. The control unit 210 may identify the first codec mode based in part on the CMC field in the first speech frame (406). For example, the first communication network 290 may transmit CMCs requiring the mobile communication device 200 to apply the AMR_5.90 codec mode from the ACS to the UL voice data transmitted on the first subscription 292.

The first speech frame may also include a DCMI field indicating a second codec mode from the ACS that is currently applied to the DL voice data received at the mobile communication device 200 from the first communication network 290 on the first subscription 292. The control unit 210 may identify the second codec mode based in part on the DCMI field in the first speech frame (408). For example, the AMR_7.95 codec mode may be currently applied to the DL voice data received at the mobile communication device 200 on the first subscription 292.

The control unit 210 may compare a bit rate of the first codec mode indicated by the CMC to a bit rate of the current UL codec mode that is applied to UL voice data transmitted on the first subscription 292 (410). The control unit 210 may determine whether the first codec mode has a same or higher bit rate as the current UL codec mode (411). If the control unit 210 determines, based on the comparison, that the first codec mode has the same or higher bit rate as the current UL codec mode (411-Y), the control unit 210 may determine to apply the first codec mode (410).

For example, the mobile communication device 200 may be currently applying the AMR_4.75 codec mode to the UL voice data transmitted on the first subscription 292. Since the AMR_5.90 codec mode required by the CMC has a higher bit rate than the current UL codec mode, the control unit 210 may determine to apply the AMR_5.90 codec mode in place of the AMR_4.75 codec mode that is currently applied to the UL voice data transmitted on the first subscription 292.

Alternately, the control unit 210 may determine that the first codec mode does not have the same or higher bit rate as the current UL codec mode (411-N). For example, the mobile communication device 200 may be currently applying the AMR_6.70 codec mode to the UL voice data transmitted on the first subscription 292, and the AMR_5.90 codec mode required by the CMC has a lower bit rate than the current UL codec mode.

When the first codec mode does not have the same or higher bit rate (i.e., has a lower bit rate) as the current UL codec mode, the control unit 210 may evaluate the quality of radio channel conditions based on measurements of one or more channel quality indicators (412). The control unit 210 may determine whether the Received Signal Level (RxLev) or the Received Signal Quality (RxQual) at the mobile communication device 200 exceeds a predetermined threshold. The predetermined threshold for RxLev may be, for example, equal to or less than −90 decibel-milliwatts (dBm) or another threshold. The predetermined threshold for RxQual may be, for example, a Bit Error Rate (BER) equal to or greater than 3.2% or another threshold. Alternately, a combination of channel quality indicators, for example, but not limited to, RxLev and RxQual, may be measured and compared to respective predetermined thresholds to evaluate the quality of radio channel conditions. One of ordinary skill in the art will appreciate that other or additional channel quality indicators may be used individually or in combination to evaluate the quality of radio channel conditions without departing from the scope of the present inventive concept.

When the control unit 210 determines that the channel quality indicator does not exceed the predetermined threshold (413-N), the control unit 210 may apply the first codec mode required by the CMC (414). For example, the control unit 210 may determine that the RxLev is less than or equal to −90 dBm (or other thresholds) and/or that the RxQual has a BER of equal to or greater than 3.2% (or other thresholds). As a result, the mobile communication device 200 may be currently applying the AMR_6.75 codec mode but may downgrade to the AMR_5.90 codec mode required by the CMC.

When the control unit 210 determines that the channel quality indicator exceeds the predetermined threshold (413-Y), the control unit 210 may determine to apply the second codec mode or a third codec mode having a higher bit rate than the first codec mode (416). For example, when the control unit 210 determines that the RxLev is above −90 dBm (or other thresholds) and/or when the RxQual has a BER lower than 3.2% (or other thresholds), the control unit 210 may change the current AMR_6.75 codec mode to the second codec mode (e.g., AMR_7.95) that is applied to the DL voice data received on the first subscription 292.

The control unit 210 may apply the first codec mode, the second codec mode, or the third codec mode to encode UL voice data (418). In addition, the control unit 210 may generate an UCMI indicating the first codec mode, the second codec mode, or the third codec mode as the current UL codec mode (420). Finally, the control unit 210 may transmit the UCMI as part of a second speech frame in the UL voice data transmitted from the mobile communication device 200 to the first communication network 290 on the first subscription 292 (422).

Figure 5:
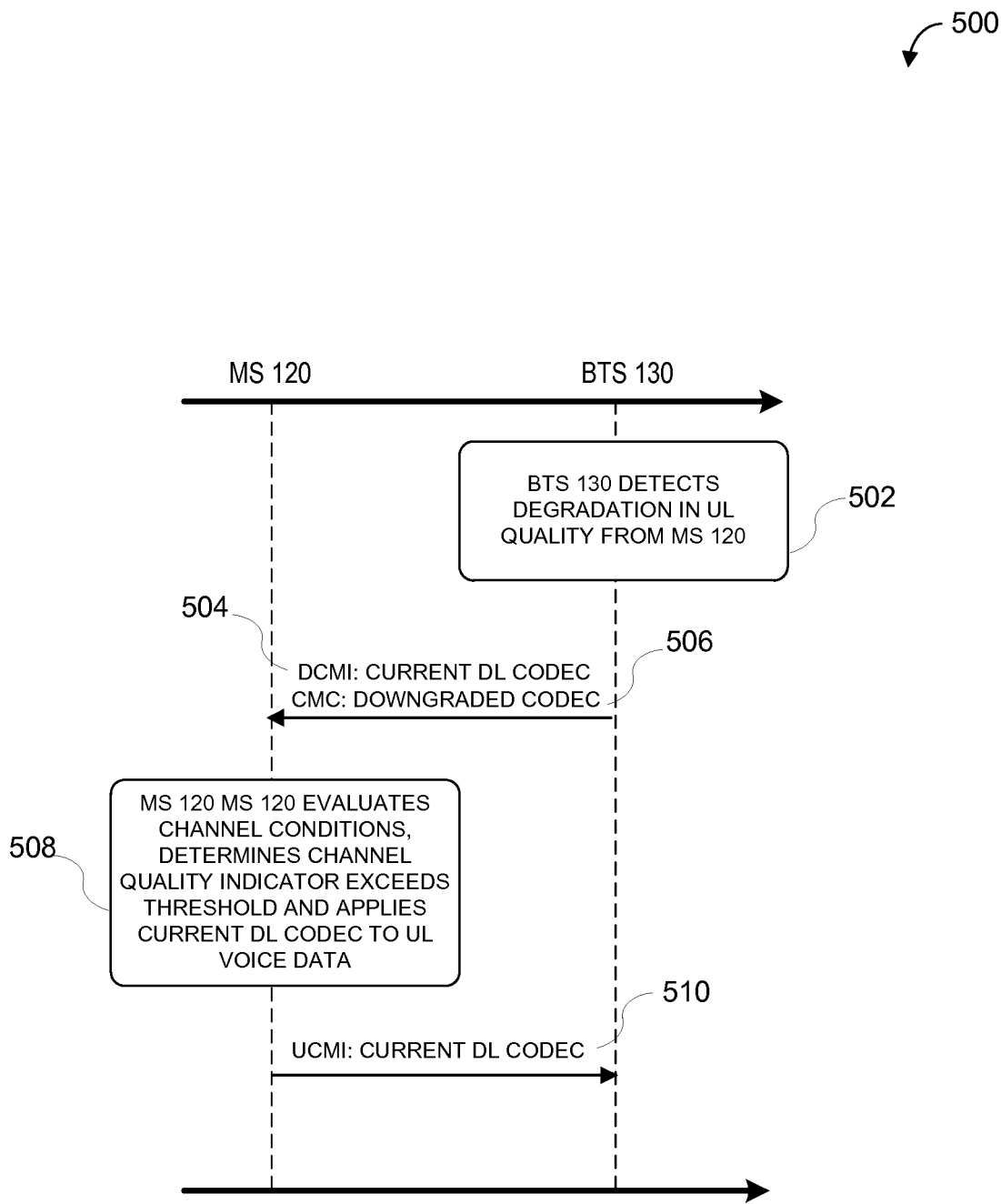
FIG. 5 is an event diagram illustrating a sequence for optimizing frequent in-band signaling according to various embodiments.

FIG. 5 is an event diagram illustrating a sequence 500 for optimizing frequent in-band signaling according to various embodiments. Referring to FIGS. 11-5, a mobile station (e.g., MS 120 or mobile communication device 200) may be exchanging voice data with a communication network (e.g., communication network 110) that may include a base transceiver station (e.g., BTS 130).

In the sequence 500, the BTS 130 may detect degradation in the UL quality from the MS 120 (502). For example, the BTS 130 may perceive degradation in the UL quality from the MS 120 when the BTS 130 evaluates the quality of radio channel conditions based on measurements of one or more channel quality indicators. For example, the BTS 130 may measure the RxLev and/or the RxQual of the UL data received from the MS 120, and determine that the RxLev is less than or equal to −90 dBm (or other threshold) and/or that the RxQual has a BER of equal to or greater than 3.2% (or other threshold). Consequently, the BTS 130 may transmit a CMC to the MS 120 that requires the MS 120 to apply a downgraded codec mode to the UL voice data transmitted from the MS 120 to the BTS 130 (504). In addition, the BTS 130 may transmit a DCMI to the MS 120 indicating the current DL codec mode that is applied to encode the voice data transmitted from the BTS 130 to the MS 120 (506).

In various embodiments, the MS 120 may change its current UL codec mode on a selective basis. In the sequence 500, the MS 120 may evaluate the radio channel conditions between the MS 120 and the BTS 130 based on measurements of one or more channel quality indicators (508). For example, the MS 120 may determine that the RxLev is above −90 dBm (or other threshold) and/or that the RxQual has a BER of less than 3.2% (or other threshold). As a result, instead of the downgraded codec mode specified by the CMC, the MS 120 may determine to apply the current DL codec mode specified in the DCMI from the BTS 130 to encode its UL voice data (508). Furthermore, the MS 120 may transmit an UCMI to the BTS 130 informing the BTS 130 that the UL voice data transmitted from the MS 120 to the BTS 130 is encoded using the current DL codec mode (510).

Figure 6:
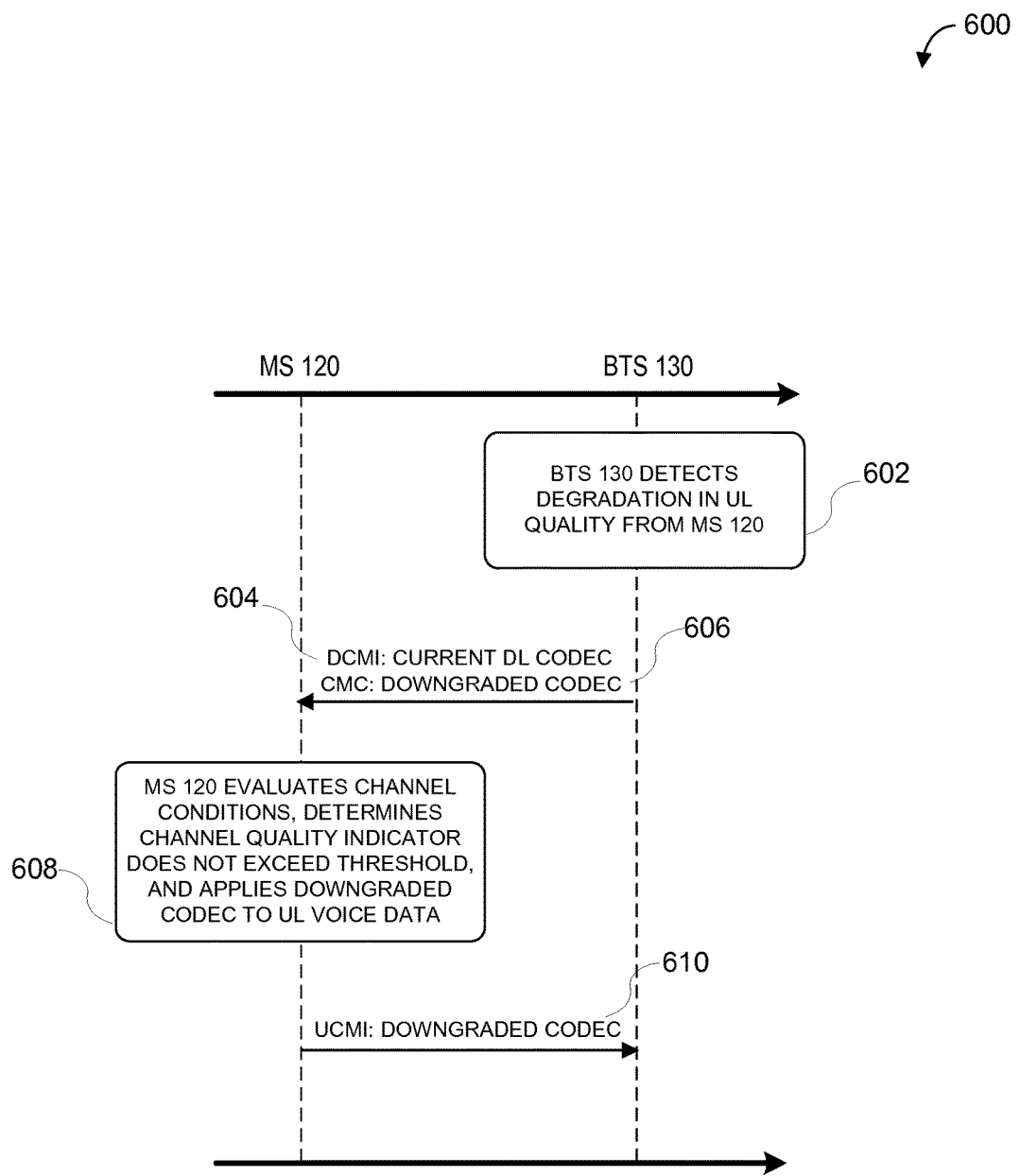
FIG. 6 is an event diagram illustrating a sequence for optimizing frequent in-band signaling according to various embodiments.

FIG. 6 is an event diagram illustrating a sequence 600 for optimizing in-band signaling according to various embodiments. Referring to FIGS. 1-6, the MS 120 may exchange voice data with the communication network 110, which may include the BTS 130.

In the sequence 600, the BTS 130 may detect degradation in the UL quality from the MS 120 (602). For example, the BTS 130 may perceive degradation in the UL quality from the MS 120 when the BTS 130 evaluates radio channel conditions based on measurements of one or more channel quality indicators. For example, the BTS 130 may measure the RxLev and/or the RxQual of the UL data received from the MS 120, and determine that the RxLev is less than or equal to −90 dBm (or other threshold) and/or that the RxQual has a BER of equal to or greater than 3.2% (or other threshold). Consequently, the BTS 130 may transmit a CMC to the MS 120 that requires the MS 120 to apply a downgraded codec mode to the UL voice data transmitted from the MS 120 to the BTS 130 (604). In addition, the BTS 130 may transmit a DCMI to the MS 120 indicating the current DL codec mode that is applied to encode the voice data transmitted from the BTS 130 to the MS 120 (606)

In various embodiments, the MS 120 may change its current UL codec mode on a selective basis. In the sequence 600, after the MS 120 receives a CMC from the BTS 130 that requires application of a downgraded codec mode to its UL voice data, the MS 120 may evaluate radio channel conditions based on measurements of one or more channel quality indicators (608). For example, the MS 120 may also determine that the RxLev is less than or equal to −90 dBm (or other threshold) and/or that the RxQual has a BER of equal to or greater than 3.2% (or other threshold). Consequently, the MS 120 may apply the downgraded codec mode to the UL voice data from the MS 120 to the BTS 130 (608) and transmit an UCMI to the BTS 130 that indicates the application of the downgraded codec mode (610).

The accompanying claims and their equivalents are intended to cover such forms or modifications as would fall within the scope and spirit of the protection. For example, the example apparatuses, methods, and systems disclosed herein may be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for codec mode adaptation by a mobile communication device, the method comprising:
    receiving, at the mobile communication device, a first speech frame;
    identifying, by the mobile communication device, a first codec mode based at least in part on a Codec Mode Command (CMC) comprising the first speech frame;
    identifying, by the mobile communication device, a second codec mode based at least in part on a downlink (DL) Codec Mode Indication (DCMI) comprising the first speech frame;
    measuring, by the mobile communication device, a Received Signal Level (RxLev) and a Received Signal Quality (RxQual) when the first codec mode is determined to not have a same or higher bit rate as the current UL codec mode;
    determining by the mobile communication device, based at least in part on a current uplink (UL) codec mode, to apply the first codec mode or one of the second codec mode and a third codec mode each having a higher bit rate than the first codec mode;
    applying the first codec mode when the RxLev and the RxQual are determined to not exceed respective predetermined thresholds; and
    applying one of the second codec mode and the third codec mode otherwise.

2. The method of claim 1, further comprising generating an UL Codec Mode Indication (UCMI) indicating one of the first codec mode, the second codec mode, and the third codec mode as the current UL codec mode.

3. The method of claim 2, further comprising transmitting the UCMI in a second speech frame.

4. The method of claim 1, wherein determining to apply the first codec mode or one of the second and the third codec modes based at least in part on the current UL codec mode includes comparing a bit rate of the current UL codec mode to a bit rate of the first codec mode.

5. The method of claim 1, further comprising applying the first codec mode when the first codec mode is determined to have a same or higher bit rate as the current UL codec mode.

6. A mobile communication device, comprising:
    a first radio frequency (RF) chain;
    a second RF chain, wherein one of the first RF chain and the second RF chain is configured to receive a first speech frame; and
    a control unit configured to:
    identify a first codec mode based at least in part on a Codec Mode Command (CMC) comprising the first speech frame;
    identify a second codec mode based at least in part on a downlink (DL) Codec Mode Indication (DCMI) comprising the first speech frame;
    measure a Received Signal Level (RxLev) and a Received Signal Quality (RxQual) when the first codec mode is determined to not have a same or higher bit rate as the current UL codec mode;
    determine, based at least in part on a current uplink (UL) codec mode, to apply the first codec mode or one of the second codec mode and a third codec mode each having a higher bit rate than the first codec mode;
    apply the first codec mode when the RxLev and the RxQual are determined to not exceed respective predetermined thresholds; and
    apply one of the second codec mode and the third codec mode otherwise.

7. The mobile communication device of claim 6, wherein the control unit is further configured to generate an UL Codec Mode Indication (UCMI) indicating one of first codec mode, the second codec mode, and the third codec mode as the current UL codec mode.

8. The mobile communication device of claim 7, wherein the control unit is further configured to transmit the UCMI in a second speech frame.

9. The mobile communication device of claim 6, wherein the control unit determines to apply the first codec mode or one of the second and the third codec modes based at least in part on a comparison of a bit rate of the current UL codec mode with a bit rate of the first codec mode.

10. The mobile communication device of claim 6, wherein the control unit is further configured to apply the first codec mode when the first codec mode is determined to have comprise a same or higher bit rate as the current UL codec mode.

11. A mobile communication device, comprising:
    means for identifying a first codec mode based at least in part on a Codec Mode Command (CMC) comprising the first speech frame;
    means for identifying a second codec mode based at least in part on a downlink (DL) Codec Mode Indication (DCMI) comprising the first speech frame;
    means for measuring a Received Signal Level (RxLev) and a Received Signal Quality (RxQual) when the first codec mode is determined to not have a same or higher bit rate as the current UL codec mode;
    means for determining, based at least in part on a current uplink (UL) codec mode, to apply the first codec mode or one of the second codec mode and a third codec mode each having a higher bit rate than the first codec mode;
    means for applying the first codec mode when the RxLev and the RxQual are determined to not exceed respective predetermined thresholds; and
    means for applying one of the second codec mode and the third codec mode otherwise.

12. A non-transitory computer readable medium having stored thereon instructions for causing one or more processors of a mobile communication device to perform operations comprising:

receiving a first speech frame;
identifying a first codec mode based at least in part on a Codec Mode Command (CMC) comprising the first speech frame;
identifying a second codec mode based at least in part on a downlink (DL) Codec Mode Indication (DCMI) comprising the first speech frame;
measuring a Received Signal Level (RxLev) and a Received Signal Quality (RxQual) when the first codec mode is determined to not have a same or higher bit rate as the current UL codec mode;
determining, based at least in part on a current uplink (UL) codec mode, to apply the first codec mode or one of the second codec mode and a third codec mode each having a higher bit rate than the first codec mode;
applying the first codec mode when the RxLev and the RxQual are determined to not exceed respective predetermined thresholds; and
applying one of the second codec mode and the third codec mode otherwise.

* * * * *